No. 741,917. PATENTED OCT. 20, 1903.
F. W. LUEDKE.
CAR TRUCK.
APPLICATION FILED JUNE 25, 1903.
NO MODEL.

WITNESSES: INVENTOR
Frederick W. Luedke
BY
Attorney

No. 741,917. Patented October 20, 1903.

UNITED STATES PATENT OFFICE.

FREDERICK W. LUEDKE, OF PHILADELPHIA, PENNSYLVANIA.

CAR-TRUCK.

SPECIFICATION forming part of Letters Patent No. 741,917, dated October 20, 1903.

Application filed June 25, 1903. Serial No. 163,107. (No model.)

*To all whom it may concern:*

Be it known that I, FREDERICK W. LUEDKE, a subject of the Emperor of Germany, residing at Philadelphia, county of Philadelphia, and State of Pennsylvania, have invented certain new and useful Improvements in Car-Trucks, of which the following is a specification.

This invention relates to trucks, and more especially to trucks for electric cars, and has for its object means whereby the unpleasant vibration caused by the truck-wheels riding over track-joints for rail-crossings is minimized to a great degree and the wear that ordinarily occurs is lessened.

A further object of the invention is to provide means whereby the dropping of the wheels in the joints as they exist between the rail-sections and street-crossings is obviated; and the invention consists of means whereby the wheels are set out of transverse alinement with each other, so that no opposite two wheels are ever at the same time over a joint, thus allowing the other three wheels by arrangement of special braces to support the truck and the fourth wheel.

With these objects in view the invention consists of the novel features, combination, and arrangement of parts and other minor features, which will be more fully described hereinafter and pointed out in the appended claims.

Figure 1:
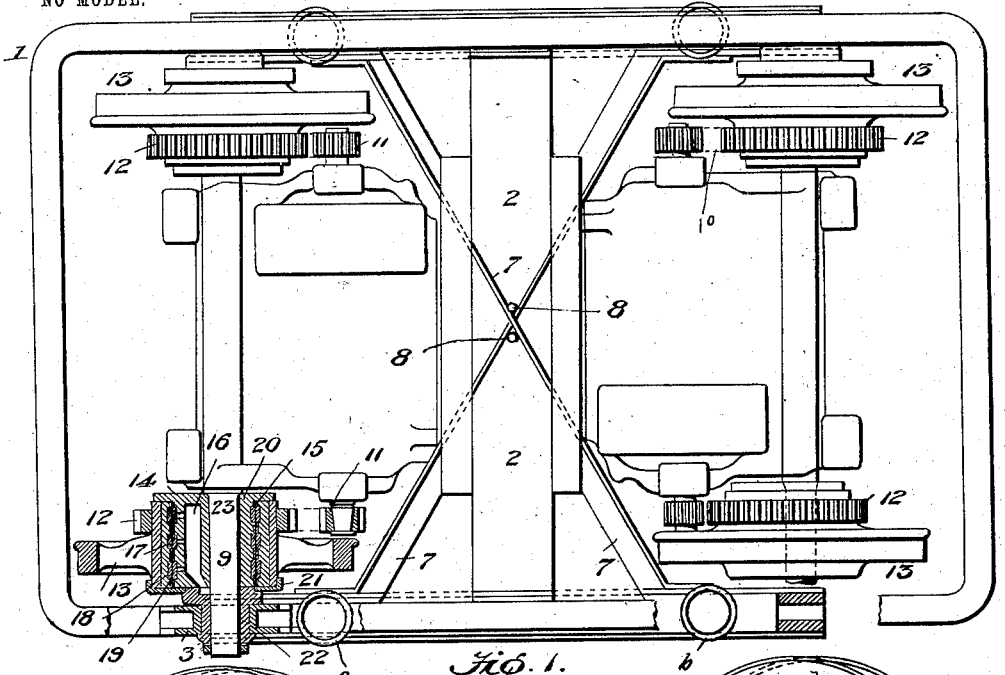
Figure 2:
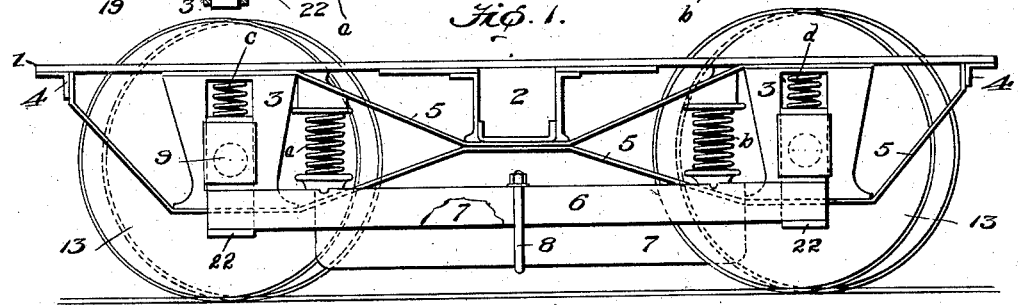
Figure 3:
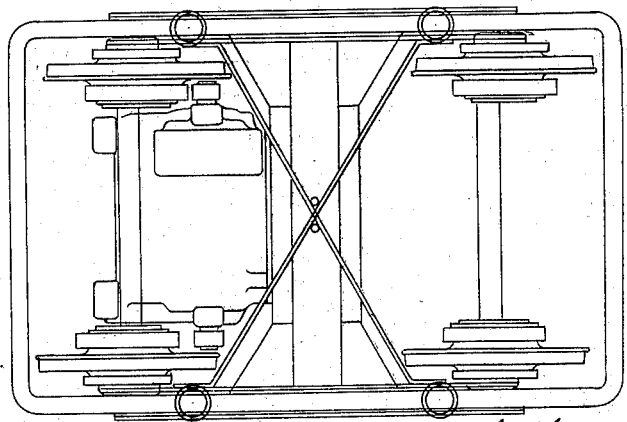

In the accompanying drawings, Figure 1 is a top plan view of the truck with one of the wheels and its coöperating parts in horizontal section. Fig. 2 is a side elevation, and Fig. 3 is a diagrammatic view.

Referring more especially to the drawings, the truck consists of the rectangular frame 1, which is provided with the usual transom 2 and pedestals 3. Secured to the under side of the frame 1 at its ends is a suitable angle-iron brace 4, to which are attached the usual tie-rods 5. This truck is similar in construction, with the exception of the novel points, to the Master Car-Builders' diamond-shaped truck patented August 27, 1901. The pedestals 3 are connected to each other by equalizing-bars 6, which are secured to the sliding blocks 22, rigidly mounted upon the axle. Extending diagonally across the truck and secured at each side to the equalizing-bars 6 are braces 7, which serve to hold the axles in rigid alinement. At the crossing-point of these braces they are secured by bolts 8. The axle 9 is mounted rigidly in an elongated sliding block 22, which is adapted to slide in the pedestals 3 and to the lower end of which are secured the equalizing-bars 6, which support the frame 1 by springs $a$ and $b$. The formation of this sliding block 22 can be plainly seen in Figs. 1 and 2 in cross-section and elevation, respectively. The frame 1 is supported by springs $a$ and $b$, that are carried on the equalizing-bars 6 and serve to assist the springs $c$ $d$, mounted within the pedestals, in minimizing the jar.

Mounted on the axle 9 and transom 2 are the motors which drive the truck through the medium of sprocket-chains 10, which travel from the pinions 11 to sprocket-wheels 12, securely mounted on the body of the wheels 13.

Eccentrically mounted on the axle 9 and keyed thereto is a hub 14, which is channeled in its outer periphery to receive the Babbitt-metal insertion 15 and which is provided with the oil-receptacle 16, having the oil-ducts 17, leading therefrom. The wheel 13, having the sprocket 12, is revolubly mounted upon the hub 14 and is provided with a similar channeling 18 to receive corresponding Babbitt-metal packing 19. This metal packing, of course, could be dispensed with and roller-bearings inserted, so as to lessen the friction. A flange 20 on the hub 14 serves as a thrust-bearing for one side of the wheel 13, and a flanged washer 21, which is held from rotation by the sliding block 22, rigidly mounted upon the axle, serves as the opposite thrust-bearing for the wheel 13. A lock-nut is screw-threaded on the end of the axle and forces the sliding block 22, the washer 21, and the hub 14 together and holds them in locked position, the hub 14 finding its limit of longitudinal movement against the shoulder 23 on the axle. The washer 21 not only acts as a thrust-bearing for the wheel, but also serves as a dust-guard for the bearing thereof. On the right-hand side of the truck the eccentrically-mounted hubs have their largest portion extending back of the axle or to the rear of the truck, and on the left hand of the truck the largest portion of said eccentrically-mounted hubs is placed forward of the axle, thus throwing the wheels out of transverse alinement with each other, as plainly shown in the diagrammatic view. In the instance where joints are opposite each other in the track the wheel 13 on the left-hand side of the truck would pass its joint first, and then the forward wheel on the right-hand side of the truck would pass the opposite joint, and then the rear left-hand wheel would pass the joint, and, lastly, the rear right-hand wheel, all tending to show that no two wheels are ever passing joints at the same time.

Having thus described my invention, what I claim as new, and desire to secure by Letters Patent, is—

1. In a car-truck, an axle having wheels mounted out of transverse alinement thereon.

2. In a car-truck, an axle having wheels mounted one ahead of the other thereon.

3. A car-truck having a one-piece axle and wheels mounted out of transverse alinement thereon.

4. A car-truck having a straight one-piece axle and wheels mounted one ahead of the other thereon.

5. A car-truck having a non-revoluble axle and the wheels mounted out of transverse alinement thereon.

6. A car-truck having a non-revoluble axle, eccentrically-mounted hubs thereon, and wheels revolubly mounted on said hubs.

7. In a car-truck having a non-revoluble axle, the combination with hubs mounted thereon, wheels rotatable on said hubs, and means for holding said hubs and wheels out of transverse alinement with each other.

8. In a car-truck, the combination with a non-revoluble axle mounted therein, of a hub mounted eccentrically on said axle, a wheel mounted on said hub, and an oil-chamber within said hub adapted to oil the bearing between the two.

9. In a car-truck, the combination with a non-revoluble axle, eccentrically-mounted hubs thereon, and wheels revolubly mounted on said hubs, of a sliding block secured to said hubs and adapted to slide in the pedestal of the truck, and a locking-nut for holding said hub and bushing on the axle.

10. In combination with a truck having a non-revoluble axle mounted in the pedestal thereof, a bushing secured to said axle, bracing means secured to said bushing, and transverse bracing means secured to said beforementioned bracing means.

11. In combination with a truck having a non-revoluble axle mounted in the pedestal thereof, a bushing secured to said axle, of equalizing means secured to said bushing and adapted to slide with the axle, and transverse angle-iron braces secured to said equalizing means and adapted to hold said axles in alinement.

12. In combination with a truck having a non-revoluble axle mounted in the pedestal thereof, a bushing secured to said axle, equalizing means secured to said bushing, of an eccentrically-mounted hub held on the axle by said bushing, a wheel revolubly mounted thereon and out of transverse alinement with its opposite wheel, and bracing means secured to said equalizing means which assists in supporting the frame and the wheel which is over a joint.

In testimony whereof I hereunto affix my signature in presence of two witnesses.

FRED. W. LUEDKE.

Witnesses:
EDITH M. GIVIN,
J. W. CAMAC.